(No Model.) 4 Sheets—Sheet 1.

H. S. BAILEY.
VEHICLE WHEEL.

No. 380,012. Patented Mar. 27, 1888.

WITNESSES:
Ogden Hoffman.
Fred F. Hall.

INVENTOR,
Howard S. Bailey.

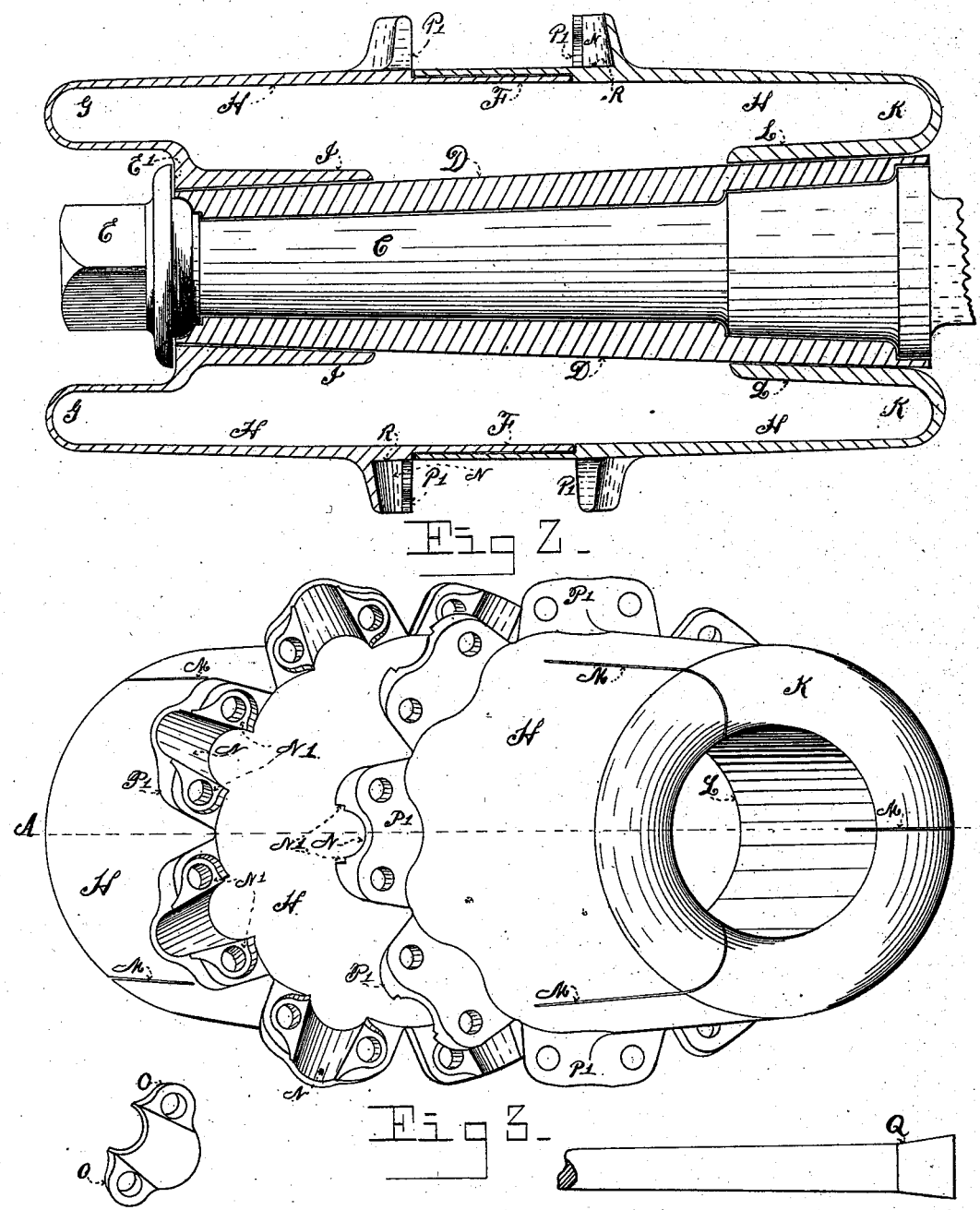

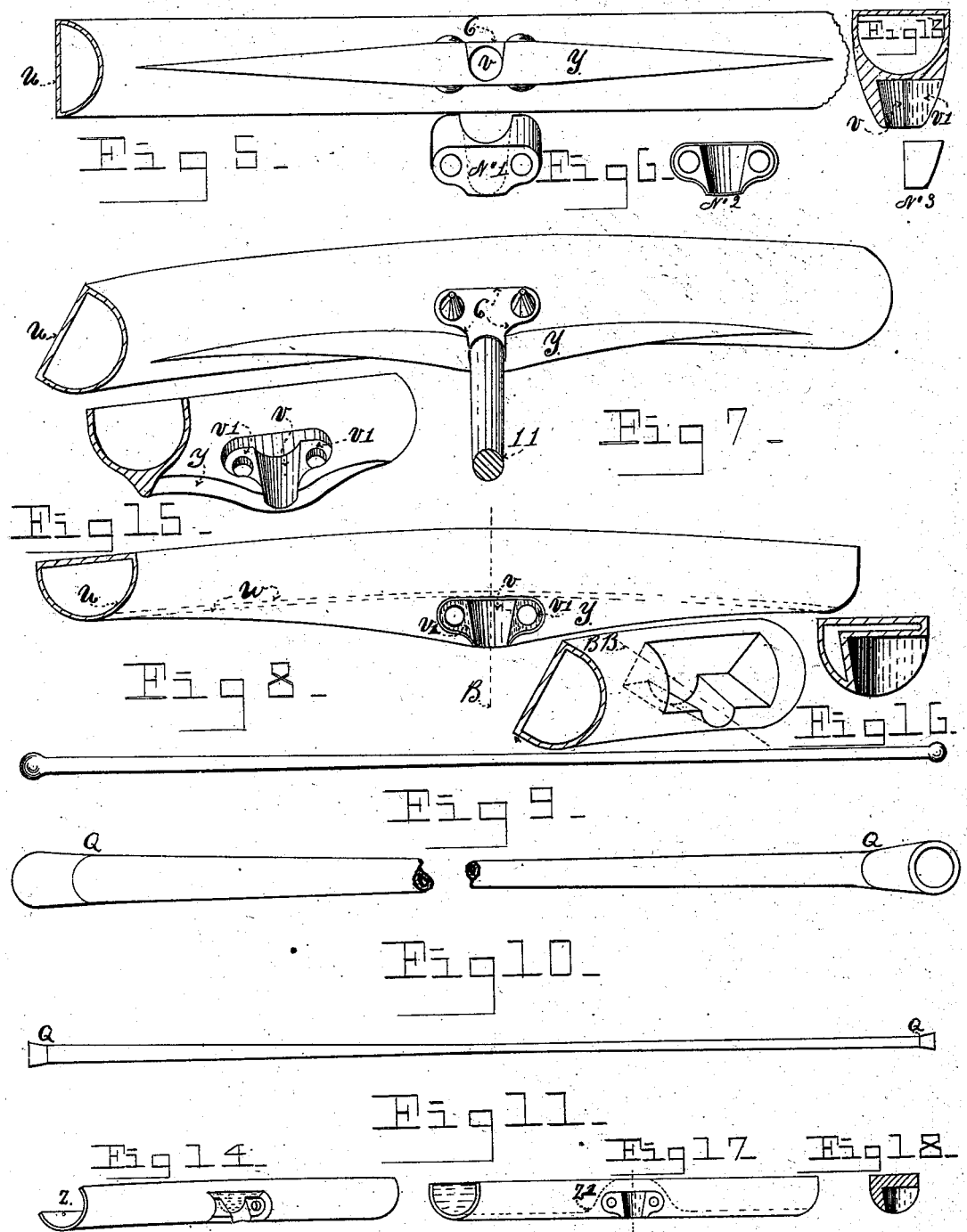
(No Model.)　　　　　　　　　　　　　　　　　　　　4 Sheets—Sheet 3.
H. S. BAILEY.
VEHICLE WHEEL.
No. 380,012.　　　　　　　　Patented Mar. 27, 1888.
WITNESSES:　　　　　　　　　　　　　　　INVENTOR,
Ogden Hoffman　　　　　　　　　　　Howard S. Bailey
Fred F. Hall (No Model.) 4 Sheets—Sheet 4.

H. S. BAILEY.
VEHICLE WHEEL.

No. 380,012. Patented Mar. 27, 1888.

WITNESSES:
Ogden Hoffman.
Fred F. Hall.

INVENTOR.
Howard S. Bailey

UNITED STATES PATENT OFFICE.

HOWARD SAFFORD BAILEY, OF DENVER, COLORADO.

VEHICLE-WHEEL.

SPECIFICATION forming part of Letters Patent No. 380,012, dated March 27, 1888.

Application filed July 16, 1887. Serial No. 244,460. (No model.)

*To all whom it may concern:*

Be it known that I, HOWARD SAFFORD BAILEY, a citizen of the United States, residing at Denver, in the county of Arapahoe and State of Colorado, have invented a new and useful Vehicle-Wheel, of which the following is a specification.

My invention relates to that class of wheels used on all varieties of vehicles.

The objects of my invention are, first, to provide a perfectly elastic wheel; second, to provide a wheel in which the spokes are secured to the hub and felly independent of each other, allowing one or more spokes to be removed without disturbing the remainder; also without removing the tire from the felly or the hub from the axle-box to which it may be attached, and, third, to provide a wheel, the hub of which shall be in itself an elastic cushion to the concussions to which a vehicle-wheel is subject. I attain these objects by the mechanism illustrated in the accompanying drawings, in which—

Figure 1 represents my metallic wheel in perspective. Fig. 2 represents a section through my elastic-cushion hub on the line A of Fig. 3. Fig. 3 represents the hub in perspective and shows the recesses N in the concentric projections P', in which the ends of the spokes are placed. Fig. 19 represents a cross-section of the hub and shows the interior filled with rubber. Fig. 4 represents a clip in perspective. It fits the recesses in the projections on the hub, and partially embraces the spokes. Fig. 5 represents a bottom plan view of a portion of my metallic felly, and shows a clip, Fig. 6, riveted in place. Fig. 6 represents three views of the clip used with the felly. Fig. 7 represents a portion of the felly in perspective, and shows the clip riveted in place and a spoke extending therefrom. Fig. 8 represents side elevation of portion of felly, showing the recess with rivet-holes. Fig. 13 represents a section across Fig. 8 on the line B. Fig. 15 represents a portion of the felly, showing the recess and a cross-section through the projection Y and felly. This is a slight modification of Fig. 8, the top of the felly being left open. Fig. 16 represents two views—a perspective and a cross-section on line B B—of a modification of the felly. Figs. 14, 17, and 18 represent three views—a perspective, side elevation, and cross-section on line A' of Fig. 17—also another modification of Fig. 8. Fig. 20 represents the felly 8 with the top open, as shown in Fig. 15, and with a rubber tire attached to it. Figs. 9, 10, 11, and 12 represent the general designs of the spokes of my metallic wheel. Fig. 10 represents a tubular spoke. Fig. 9 represents at the ends a slight modification, and if adopted the recesses in the hub and felly must match it. Figs. 11 and 12 represent at the ends the form matching the recesses shown in the hub and felly.

Similar letters refer to similar parts throughout the several views.

Referring to Fig. 2, C represents a carriage-axle, D the axle-box, and E the axle-nut.

The hub H is preferably made of the finest grade of spring-steel. When this material is used, the hub can be made under a drop-hammer or power-press. It should be made in two pieces and welded together in the center F. For the wheels of heavy transit-wagons not requiring that degree of elasticity necessary for light-driving vehicles, the hubs may be made of steel or malleable-iron castings. The hub is a hollow cylindrical shell. The metal in thickness tapers from the center F to each end, G and K, where it makes a graceful curve of sufficient radius to form an elastic spring. The metal at each end then recedes into the interior of the hub, forming solid circular collars I and L, in which the axle-box D is driven.

A step, E', Figs. 1 and 2, is formed in the interior of the front end of the hub. This should come even with the end of the box D, the two forming a shoulder for the flange of the nut E to bear against. The material at the curves G and K should be thin enough to give a distinct vibration to the metal in the center of the hub under severe blows, such as would be transmitted to it by a rapid-running wheel on uneven pavement. To facilitate the elasticity of the hub, the outside may be provided with three or more very thin slots, M, cutting through the metal at the curves and extending toward the center of the hub or to it. The interior of the hub may also be filled with rubber, H', Fig. 19, which will assist the hub and also reduce the noise made by the wheel. Where solid collars P, Fig. 1, are used, instead of projections P', as shown in Fig. 2, the slots should extend through them, cutting them between every two spokes, as represented, or between every spoke, if preferred. The collars P or projections P' are a part of the surface of the hub. They are each provided with a recess, N, the center of which is formed to match and to partially embrace the ends of the spokes. The rest of the recesses N' extend into the side of the projections or collars, and are filled by the wings O of the clips, Fig. 4, which set into them and partially surround the spokes.

Fig. 12 represents the form I prefer to give to the ends of the spokes, and the recesses N in the hub are made to match it. At the point Q, corresponding with the height of the projections, the ends taper out larger, increasing in diameter to the end, which bears on the top of the hub in the bottom of the recesses at R.

The clips are secured in place by hot rivets, which in cooling draw the clips very tightly in place, and have a tendency, on account of the direction of the taper on the ends of the spokes, to force them hard against the top of the hub. The essential features of this hub consist of its being constructed of one piece of elastic metal; of the proportioning of the material to allow the center to vibrate in response to the concussions which will be transmitted to it through the spokes; of the application of the spokes to the exterior surface of the hub independent of each other, and not interfering in any way with its duties as an elastic cushion or with its relations to its axle-box. As to the general outlines of the hub, I claim the right to modify the same as experience and the duties to be performed shall dictate.

Figs. 9, 10, 11, and 12 represent a form of spoke essential to the success of a metallic wheel. From the point Q, where they emerge from the hub, they taper gradually to the central portion of the spoke, and then again enlarge to the felly. This form places the greatest amount of stock where the severest strains come, close to the hub. The strains on the spokes close to the felly, while not so severe as at the hub, are much more so than at the center, which in this form furnishes at the central portion of the spoke the elasticity which allows the spokes to bend when the wheel is subjected to severe side strains without cramping them at the hub and felly.

Figs. 5, 7, 8, 13, 15, and 20 represent various views of portions of the steel felly of my metallic wheel. In cross-section between the spokes it is a semicircular shell, preferably with the top closed, thus forming a continuous hollow felly of great strength and lightness. When a rubber tire, U', Fig. 20, is used instead of an iron tire, or not any, as preferred, the top is left open, as in Figs. 15 and 20. The end U of Figs. 2, 5, 7, and 8 represent a cross-section between the spokes. The felly should be made under a drop-hammer or power-press. At the points where the spokes are located the felly is provided with an additional amount of metal, Y, which projects from the under side of the felly. They strengthen the felly at the right points, and they should be arranged to give it a graceful appearance. Each projection Y is provided with a recess, V, formed in its side, the central portion of which is formed to match the taper ends of the spokes and to partially embrace them. The remaining portions, V', of the recesses, which branch out in the side of the projections, are filled by the clips, Fig. 6. No. 1 is a perspective view; No. 2, a front elevation; No. 3, an end elevation. They are secured in place by rivets and are formed to partially embrace the spokes.

Fig. 13 represents a cross-section on the line B of Fig. 8.

Fig. 15 represents the recess in the side of the felly, in perspective, and a cross-section through the felly near to the spoke. The dotted lines w in Fig. 8 represent the depth of the hollow portion of the felly.

Fig. 16 represents two views—a perspective view and a cross-section on the line B B of perspective view—of a modification of felly 8. This felly is not provided with projections. The metal which forms the recesses is pressed in from the side, as shown in cross-section.

Figs. 14, 17, and 18 represent another modification of the felly shown in Fig. 8. In cross-section at Z it is similar, except that the top is open.

Fig. 18 represents a cross-section on the line A' of Fig. 17, and shows that the felly at the point where the recesses are made is solid.

The dotted lines Z' in Fig. 17 represent the extent of the solid portion of this felly, which extends to the top, forming a good bearing on which to shrink a tire. Fig. 14 represents a portion of this felly with the recesses in perspective.

The essential features of these forms of fellies are their general design, which insures strength, lightness, and durability. The use of a tire on forms 8 and 16 is optional with the user; also, the application of the spokes to the felly, which forms a stronger and more convenient method than any in use, and one in which they are independent of each other and of the tire. As to the forms given to the recesses in the hub and felly and to the forms given to the ends of the spokes, I claim the right to modify the same if experience proves that better results can be obtained by so doing.

Figure 1:
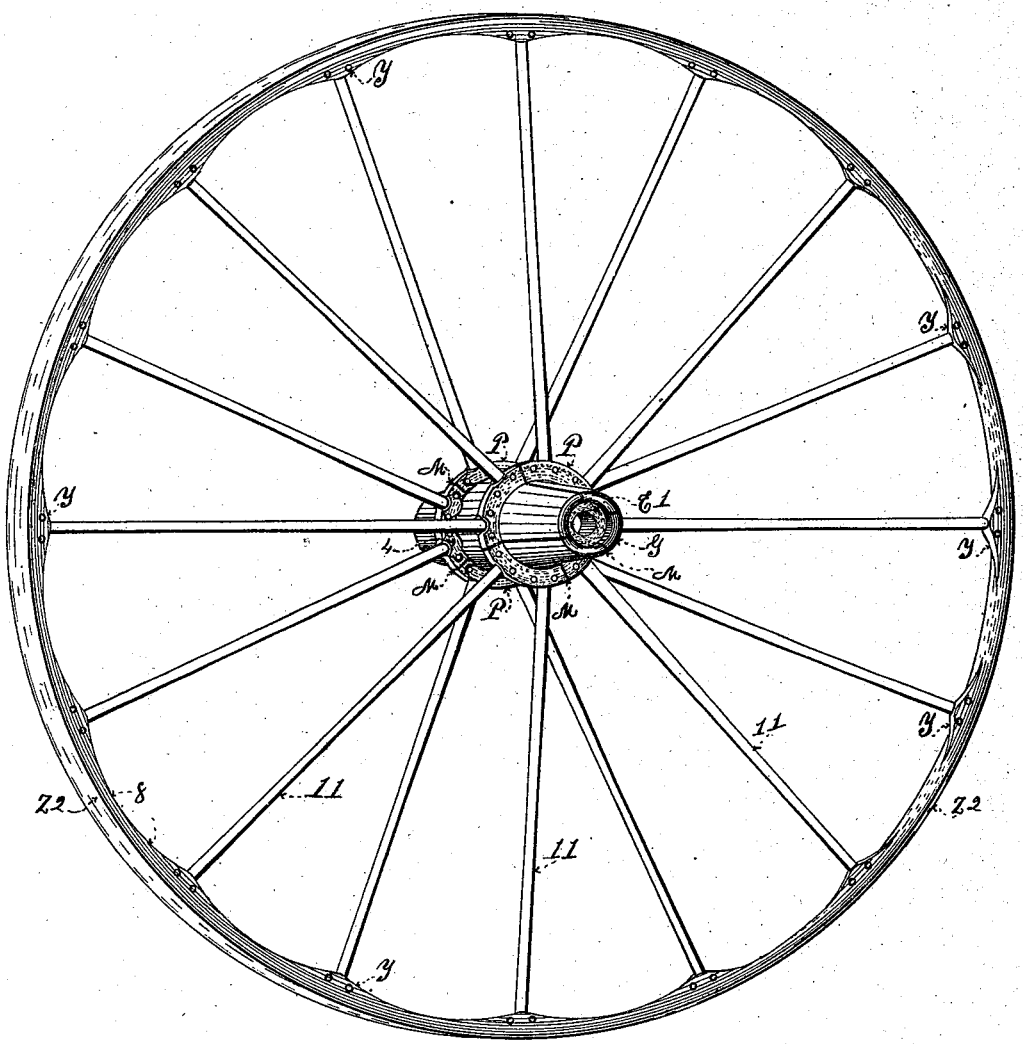
Figure 19:
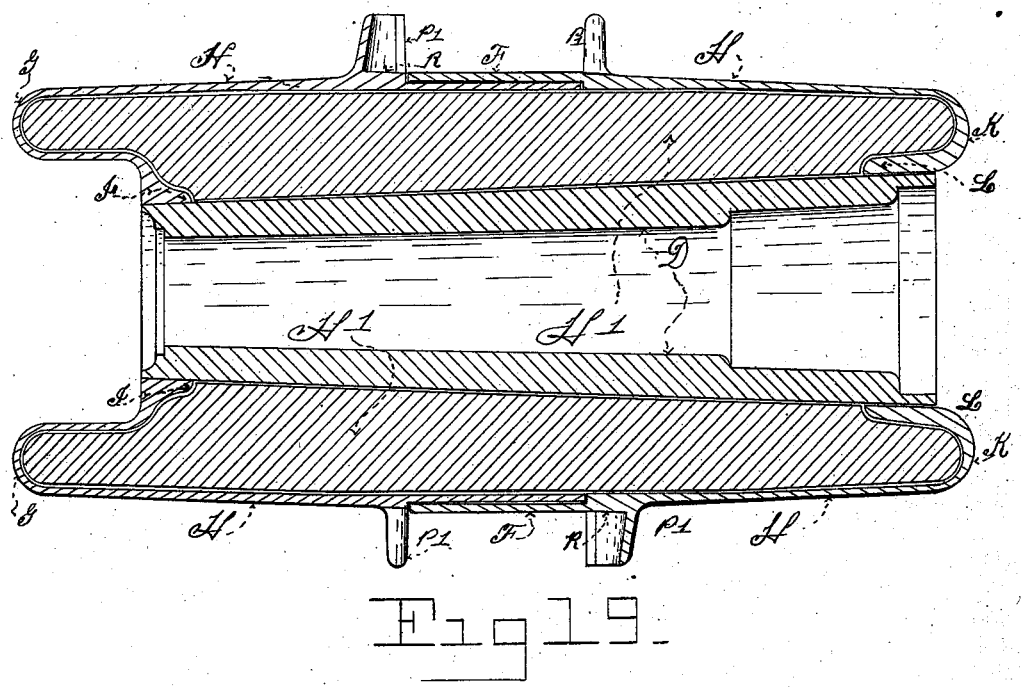
Figure 20:
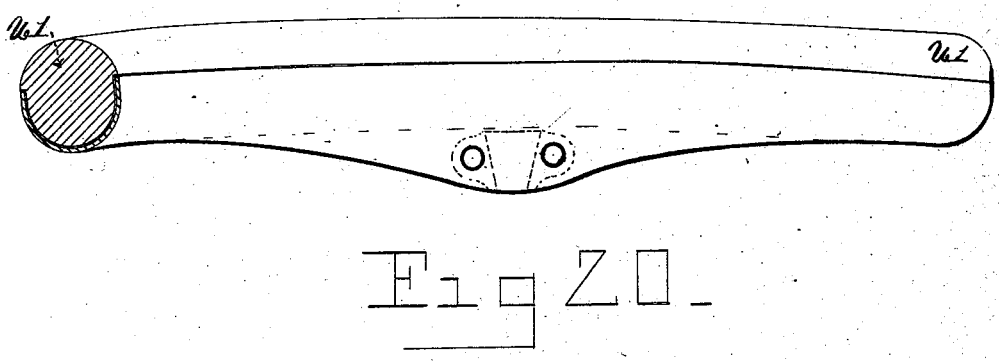

Fig. 1 represents in perspective my metallic wheel complete with tire $Z^2$. In this view the clips and recesses are on the back side of the felly, which is preferable, and only the rivet-heads are seen on the front side. The spokes and clips are shown in place as they appear on the hub. Metallic wheels have been denied the prominent position they should occupy by two serious defects—first, the liability of the spokes breaking close to the hub and felly, and, second, the inability to replace a bent or broken spoke without taking the wheel all to pieces. The first can be remedied by the proper form and distribution of the metal in the spoke, together with a hub elastic enough to disseminate the concussions of the wheel, the second by the independent and external application of the spokes to the hub and felly.

Having described my invention, what I claim as new, and desire to secure by Letters Patent, is—

1. In a metallic vehicle-wheel, an elastic-cushion hub having a cylindrical hollow shell curving at the ends and receding into the cylinder, forming circular taper collars adapted to embrace the axle-box, having projections radiating from the circumference of the hub, provided with recesses in the sides of said projections adapted to receive, match the form of, and partially embrace the spokes, having clips adapted to match said recesses in sides of the projections and to partially embrace said spokes, as specified.

2. In a metallic wheel, the cylindrical-shell hub H, having curved ends G and K, and collars I and L, the projections P', provided with the recesses, having clips 4, adapted to fit said recesses, having slots M through the surface of hub, as specified.

3. In a metallic wheel, a metallic felly in cross-section, a semicircular shell forming a continuous hollow felly having fins, lugs, or projections forming a part thereof, provided with recesses adapted to receive and match the form of and to partially embrace the ends of spokes having clips fitting said recesses, substantially as and for the purpose herein set forth.

4. A metallic felly having recesses in its sides and clips matching said recesses, adapted to receive and secure in said recesses the ends of spokes, as herein set forth.

5. In a metallic wheel, metallic spokes of any form of cross-section largest at the base and tapering smaller to the central portion of the spoke, smallest at the center and tapering larger to the end, and provided at the ends with enlarged portions, as round knobs or tapered extended heads, or any form adapted to fit recesses in the sides of fellies and in hubs, as set forth and described.

6. The combination, in a metallic wheel, of the semicircular hollow felly 8, having recesses V in the sides and having clips 6 fitting said recesses, with the hub H, having curved ends G and K receding into hub and forming taper collars I and L, having projections P' provided with recesses N, and clips 4, matching the same, as herein specified.

7. In combination, the elastic-cushion hub H, having projections provided with recesses and clips matching the same, and the metallic hollow felly 8, having recesses in its sides and clips matching the same, with the metallic spokes having ends formed to match the recesses in the hub and felly, all arranged as herein set forth.

8. In a metallic wheel, the cylindrical hub H, having the ends G and K curved or shaped to recede into the interior of the hub, forming collars I and L adapted to receive an axle-box, the surface of the hub having projecting lugs or collars provided with recesses and with clips fitting the same, adapted to receive and match the ends of spokes, the hub being also provided with slots M through its surface and having the interior filled with rubber or other substance elastic in itself and qualified to deaden the noise made by running wheels, as specified.

9. In a metallic vehicle-wheel, the metallic felly in cross-section, a semicircular shell provided with projections or lugs extending from the under side of felly, having recesses in the side of said projections and clips fitting the same, adapted to receive the ends of spokes, and provided with a rubber tire, U', adapted to fit the semicircular recess of the felly, as herein specified.

10. The combination, in a metallic wheel, of the metallic cylindrical hub H, having the ends G and K curved or formed to recede into the interior of the hub and form collars I and L, adapted to receive and match the form of axle-boxes, and provided with projections P' or collars P, with recesses N and N', and with clips 4 fitting the same and adapted to receive and match the forms of the spokes, having the interior of the hub filled with an elastic substance adapted to deaden the noise made by running wheels, with metallic spokes of any form of cross-section largest at the base and tapering smaller to the central portion of the spoke, smallest at the central portion of the spoke and tapering larger to the end, and with the metallic felly in cross-section, a semicircular shell provided with projections Y, containing recesses V and V', and with clips 6 fitting the same, adapted to receive and match the forms of the ends of the spokes, and provided with a rubber tire, all arranged as herein set forth and described.

HOWARD SAFFORD BAILEY.

Witnesses:
OGDEN HOFFMAN,
FRED F. HALL.